United States Patent
Hind et al.

(10) Patent No.: US 7,426,515 B2
(45) Date of Patent: Sep. 16, 2008

(54) EDGE DEPLOYED DATABASE PROXY DRIVER

(75) Inventors: John R. Hind, Raleigh, NC (US); Yongcheng Li, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1084 days.

(21) Appl. No.: 10/047,860

(22) Filed: Jan. 15, 2002

(65) Prior Publication Data
US 2003/0135505 A1 Jul. 17, 2003

(51) Int. Cl.
G06F 17/30 (2006.01)
(52) U.S. Cl. .......................................... 707/10; 719/328
(58) Field of Classification Search ...................... 707/1, 707/100, 101, 4; 709/321, 328, 212
See application file for complete search history.

(56) References Cited

U.S. PATENT DOCUMENTS

| | | | |
|---|---|---|---|
| 6,272,492 B1 * | 8/2001 | Kay ............................ | 707/10 |
| 6,336,117 B1 * | 1/2002 | Massarani .................... | 707/100 |
| 6,498,897 B1 * | 12/2002 | Nelson et al. ................. | 707/1 |
| 6,523,040 B1 * | 2/2003 | Lo et al. ...................... | 707/101 |
| 6,574,742 B1 * | 6/2003 | Jamroga et al. ............. | 713/400 |
| 6,665,674 B1 * | 12/2003 | Buchanan et al. ............ | 707/10 |
| 6,801,914 B2 * | 10/2004 | Barga et al. .................. | 707/10 |
| 6,829,654 B1 * | 12/2004 | Jungck ......................... | 709/246 |
| 6,976,090 B2 * | 12/2005 | Ben-Shaul et al. .......... | 709/246 |
| 7,111,052 B1 * | 9/2006 | Cook ........................... | 709/219 |
| 7,225,249 B1 * | 5/2007 | Barry et al. .................. | 709/227 |
| 2002/0004796 A1 * | 1/2002 | Vange et al. .................. | 707/10 |
| 2002/0032806 A1 * | 3/2002 | Machin et al. ............... | 709/328 |
| 2002/0065899 A1 * | 5/2002 | Smith et al. .................. | 709/214 |
| 2003/0055826 A1 * | 3/2003 | Graham ....................... | 707/10 |
| 2003/0072029 A1 * | 4/2003 | Wiley et al. .................. | 709/321 |
| 2003/0074632 A1 * | 4/2003 | Marks et al. ................. | 715/500 |
| 2003/0115281 A1 * | 6/2003 | McHenry et al. ............ | 709/213 |
| 2003/0135509 A1 * | 7/2003 | Davis et al. .................. | 707/100 |

OTHER PUBLICATIONS

Hua Chen et al. Wormhole Caching with HTTP PUSH Method for a Satellite-Based Web Content Multicast and Replication System. 1999.*

(Continued)

*Primary Examiner*—Neveen Abel-Jalil
(74) *Attorney, Agent, or Firm*—Jeanine Ray-Yarletts, Esq.; Steven M. Greenberg, Esq.; Carey Rodriguez Greenberg & Paul LLP

(57) ABSTRACT

An edge-deployed database proxy. A database access system which has been configured with the database proxy can include a universal database connectivity driver having a first exposed interface through which access to a database server can be provided; a database proxy driver registered with the universal database connectivity driver; and, a database driven application programmatically linked to the database proxy driver. Significantly, the database proxy driver can have a second exposed interface which conforms with the first exposed interface of the universal database connectivity driver. The database proxy driver further can have a configuration for invoking at least one auxiliary task in addition to providing access to the database server through the first exposed interface of the universal database connectivity driver.

7 Claims, 3 Drawing Sheets

OTHER PUBLICATIONS

Yang Chang et al. Providing Quality of Service Guarantee in Internt Proxy Method. IEEE 2000.*

A Uniform Method for Distribution of Internet Data Appropriate Servers. TDB-ACC-No. NNRD 452159 IBM Technical Disclosure Bulletin, Dec. 2001.*

Oracle9i Application Server Data Sheet Jun. 2001.*

IBM Systems Journal issue 40-1, Technology for e-business, WebSphere as an e-business server—Feature paper.☐☐by D. F. Ferguson and R. Kerth IBM Journal vol. 40 No. 1, 2001.*

The Gateway System: Uniform Web Based Access to Remote Resources (1999). by Geoffrey Fox et al. ☐☐*

Providing Quality of Service Guarantee in Internet by a. Proxy Method. Yang Chang. &. Ng Chee Hock.*

White, Seth, et al., "JDBC™ 2.0 API", Sun Microsystems Inc., (May 30, 1998).

"JDBC™ Data Access API, The JDBC™ API Universal Data Access for the Enterprise", <http://java.sun.com/prdoucts/jdbc/datasheet.html>, (Jul. 31, 2001).

"JDBC™ Guide: Getting Started, Introduction", <http://java.sun.com/prdoucts/jdk/1.2/docs/guide/jdbc/getstart/intro.doc.html>, (Oct. 23, 2001).

"JDBC™ Guide: Getting Started, Database Connections", <http://java.sun.com/prdoucts/jdk/1.2/docs/guide/jdbc/spec/jdbc-spec.frame6.html>, (Oct. 23, 2001).

"JDBC™ Guide: Getting Started, JDBC Interface Definitions", <http://java.sun.com/prdoucts/jdk/1.2/docs/guide/jdbc/spec/jdbc-spec.frame13.html>, (Oct. 23, 2001).

* cited by examiner

EDGE DEPLOYED DATABASE PROXY DRIVER

BACKGROUND OF THE INVENTION

1. Statement of the Technical Field The present invention relates to the field of universal database access and more particularly to an edge-deployed database proxy driver.

2. Description of the Related Art

As business organizations deploy important business applications over the Internet, challenges arise in the form of processing delays and network latencies. Specifically, the placement of application content in a centralized server can compel users' requests to traverse multiple congested networks in an attempt to effectively interact with the application. As a result, this centralized approach to deploying applications on the Internet can hinder the attainment of scalability, reliability and performance levels that are considered "mission-critical" in the deployment of a business application.

In consequence of the inherent deficiencies of the centralized approach, there has been a recent trend to move more application processing functions to the edge of the network. In lay terms, the "edge" of the network refers to that portion of a publicly accessible network which is disposed communicatively closer to the end-user. While the positioning of servers and other network devices at the edge of the network can bear direct relation to the geographical positioning of the end-users, in some cases, the positioning of servers at the edge of the network can bear closer relation to the available communications bandwidth and the performance of network components linking end-users to the servers.

Importantly, many applications which benefit from edge-deployed applications are database-driven, or at least database dependent in some way. For example, some e-business applications interact with database servers in which business data can be stored. While some conventional database servers can be accessed through a proprietary database connectivity interface, in recent years, database driven applications have been able to access database servers through database access middleware.

Database access middleware provides a stylized connection between an application computer program and a database. By stylized connection, it is meant that a database link has a formal, published definition. This formal, published definition can identify the interface through which connected application programs can issue data access requests and, in response thereto, receive database content through the database link. Two contemporary examples of database access middleware include the Open Database Connectivity (ODBC) and JDBC™ (Sun Microsystems, Inc.) specifications. ODBC and JDBC are important connectivity technologies because presently, ODBC and JDBC have been implemented in a bevy of disparate platforms while providing a common interface to several different database servers.

Primarily, database access middleware shuttles data requests and database content to and from application programs. In addition, database access middleware helps to ensure security, and it insulates the application from having to interact directly with the database server. Generalized query tools can utilize database access middleware (rather than the database server itself) to provide query services for multiple types of database products. Also, computer programs written according to Visual Basic, C, C++, Pascal, COBOL and other programming languages can perform database operations via ODBC. By comparison, programs based upon Java™ (Sun Microsystems, Inc.) technology can use JDBC to perform database operations.

JDBC technology is an application programming interface (API), often erroneously referred to as "Java Database Connectivity", that permits application programs to access virtually any tabular data source using the Java programming language. In consequence, JDBC technology provides cross-database management system (DBMS) connectivity to a wide range of databases, and other tabular data sources, such as spreadsheets or flat files. With a JDBC-enabled driver, a developer can easily connect all corporate data even in a heterogeneous environment.

Presently, it is known to deploy both middleware and application management programs at the edge of the network. These application management programs can include load balancers, database caches and application analyzers. Still, the explicit use of such application management programs in conjunction with middleware requires the coordinated re-tooling of the client application, the database server, or both. Yet, in many cases, the operation of the application management programs can capitalize upon operational data generated in the course of providing data access through the middleware.

SUMMARY OF THE INVENTION

The present invention can include a database access system and method which utilizes a database proxy driver in a layer between an application and database connectivity driver. The database proxy driver can share a matching interface with the database connectivity driver so that the database proxy driver can act as a proxy to the database connectivity driver without requiring modification of the application. Acting as a proxy to the database connectivity driver, the database proxy driver can perform auxiliary tasks, such as edge based tasks, in addition to processing database connectivity requests. In this way, a coordinated re-tooling of the application or database server is not required.

In one aspect of the present invention, a database access system which has been configured in accordance with the inventive arrangements can include a universal database connectivity driver having a first exposed interface through which access to a database server can be provided; a database proxy driver registered with the universal database connectivity driver; and, a database driven application programmatically linked to the database proxy driver. Significantly, the database proxy driver can have a second exposed interface which conforms with the first exposed interface of the universal database connectivity driver. The database proxy driver further can have a configuration for invoking at least one auxiliary task in addition to providing access to the database server through the first exposed interface of the universal database connectivity driver.

Importantly, each of the universal database connectivity driver, database proxy driver and database driven application can be disposed in an edge device in a computer communications network. In consequence, the auxiliary task can include load balancing. Also, the auxiliary task can include caching. In addition, the database access system also can include a log file of data request meta-information; and, an application analyzer configured to tune operation of the auxiliary task based upon the meta-information.

Alternatively, the proxy driver can be disposed at a back-end application server in a computer communications network. In this alternative configuration, the proxy driver can capture meta-information relating to how an associated application uses various databases in association with patterns of user requests to that back-end application server. Once collected, the meta-information can be used to decide which applications and user invocation patterns can be deployed and fielded respectively at various edge devices across multiple physical locations.

In another aspect of the invention, a database access method can include receiving a database connectivity request through a corresponding first exposed database connectivity method from a database driven application; forwarding the database connectivity request to an underlying database connectivity driver through a corresponding second exposed method having a method prototype which matches a method prototype of the first exposed database connectivity method; and, performing at least one auxiliary task in addition to forwarding the database connectivity request. Notably, each of the receiving, forwarding and performing steps can be performed in an edge device. In consequence, the performing step can include performing a load balancing task. Similarly, the performing step can include performing a database caching task.

The database access method also can include collecting meta-data for each received database connectivity request; and, modifying operation of the auxiliary task based upon an analysis of the collected meta-data. The modifying step can include generating rules which direct database connectivity requests to particular instances of a database server which are most likely to respond quickly based upon database latency patterns inherent in the collected meta-data. Also, the modifying step can include selectively caching result sets in a database cache based upon request frequency patterns inherent in the collected meta-data.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a database proxy driver which can process application data requests in an edge server while transparently and concurrently performing edge processing tasks such as load balancing or data caching. Importantly, unlike prior art database drivers which merely facilitate and control access to a database server, in the proxy data database driver of the present invention, not only can the proxy driver facilitate and control access to the database server, but also the proxy driver can initiate and, optionally, perform the edge processing tasks responsive to receiving a data request. Finally, the interface to the proxy database driver can conform to the interface of an underlying database connectivity driver, for example ODBC or JDBC. In this way, an application can be configured to operate with the proxy database driver merely be substituting a reference to the underlying database connectivity driver with a reference to the proxy database driver.

Figure 1:
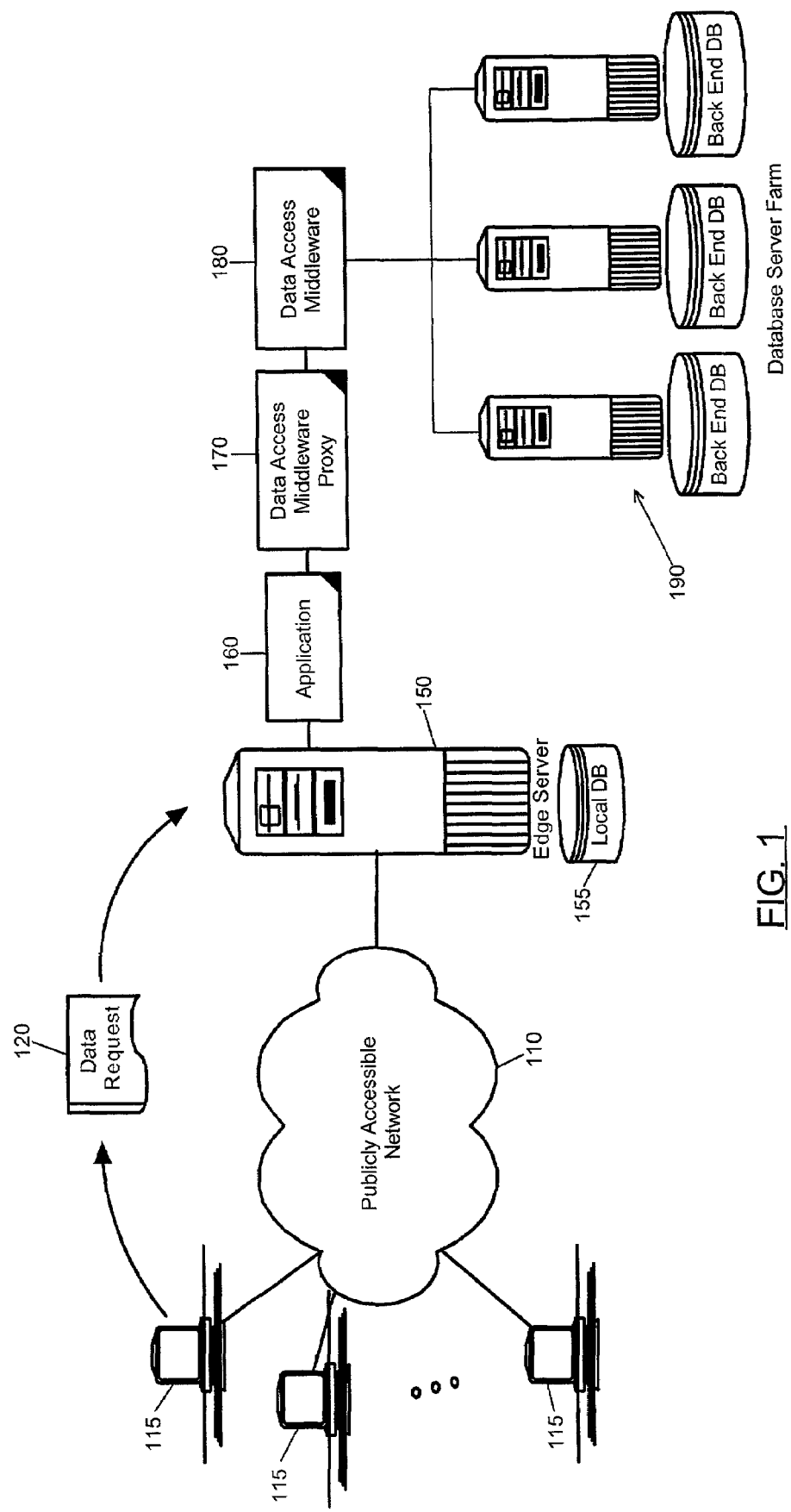
FIG. 1 is a schematic illustration of a database-driven network application in which an edge-deployed database proxy driver has been implemented in accordance with the inventive arrangements.

FIG. 1 is a schematic illustration of a database-driven network application in which an edge-deployed database proxy driver has been implemented in accordance with the inventive arrangements. The network application 160 can be deployed in an edge-server 150 positioned at the edge of a publicly accessible network 110, for instance the Internet. Through the network 110, end-users 115 through their respective client computing devices can interact with the application 160, including transmitting data requests 120 to the application 160.

Notably, the application 160 can be linked to data connectivity middleware 180 through the database proxy driver 170 of the present invention. The data connectivity middleware 180 can be any suitable middleware product which can provide an API for accessing data in a database server, such as a database server 155 local to the edge server 150, and those back-end database servers included as part of a database server farm 190. Significantly, though the back-end database servers of the database server farm 190 are shown in close proximity to one another, it is a distinct advantage of the present invention that the database proxy driver 170 can interact with the database servers of the database server farm 190 though these database servers may have been geographically positioned apart from one another.

In operation, end-users 115 can interact with the application 150 and can generate data requests 120 which first can be received in the application 160 at the edge server 150. The application 160, using the API of the database proxy driver 170, can request the establishment of a connection with a suitable database server. The database proxy driver 170, instead of merely establishing a connection with a pre-configured database server, can perform an edge task such as load balancing in order to identify a suitable database server with which a connection can be established. Once the database server has been identified, the database proxy driver 170, using the API of the underlying database connectivity driver 180, can establish a connection with the identified database server. Once a connection has been established, the data request 120 can be processed.

Subsequent data requests also can be processed in a similar manner over the now established connection with the database server. For the subsequent data requests, as in the case of an initial data request, the database proxy driver 170 can perform edge tasks. In this regard, the database proxy driver 170 can be viewed as layering the performance of edge tasks upon the primary role of data access middleware of moderating data access operations between an application and a back end database server. Unlike prior art middleware implementations, however, in the present invention, the database proxy driver 170 can be incorporated into an existing network-deployed, database driven application merely by substituting a reference to an existing database connectivity driver with the database proxy driver 170 of the present invention.

Figure 2:
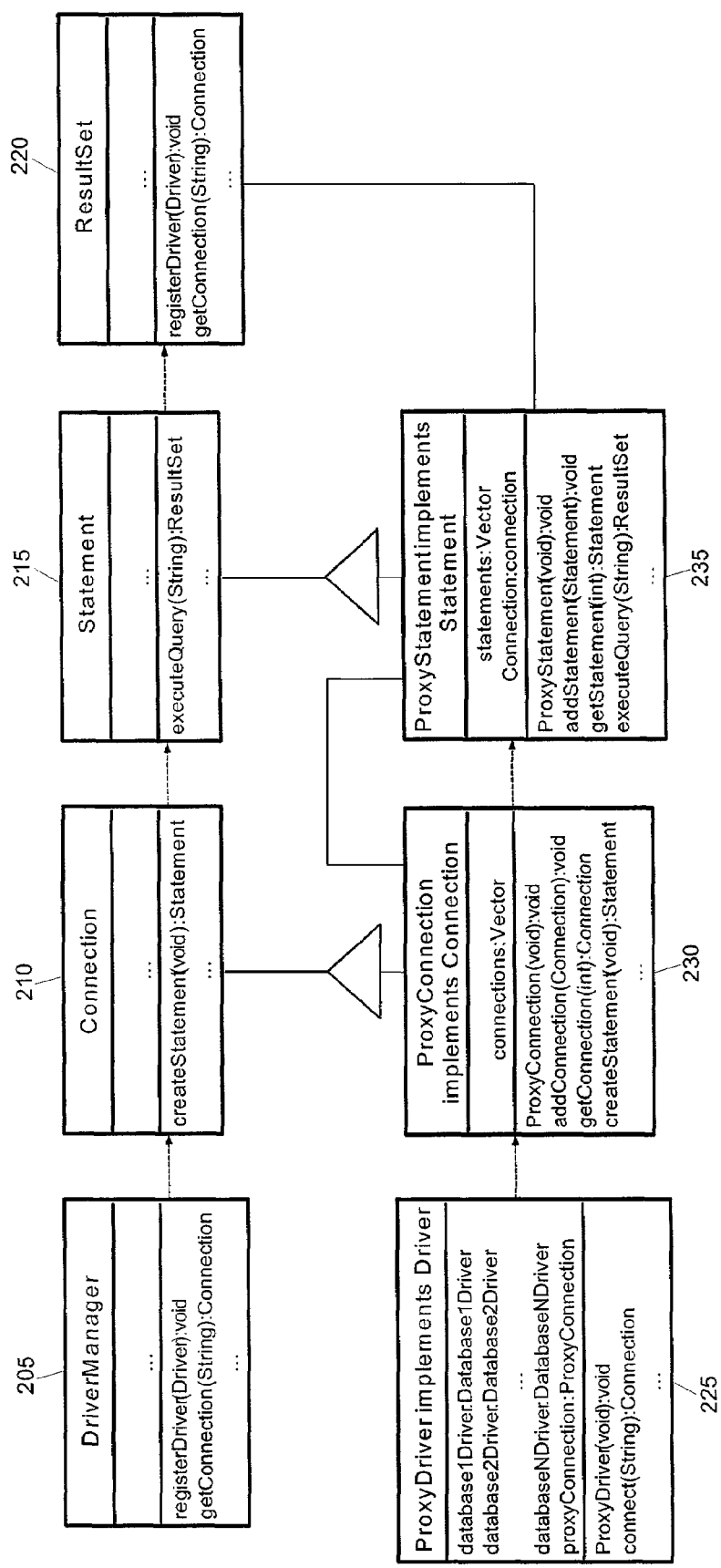
FIG. 2 is a UML diagram of the database proxy driver of FIG. 1.

In order to accommodate the seamless integration of the database proxy driver 170 with the database-driven application 160, the database proxy driver can include an API which conforms with the API of the underlying database connectivity driver 180. For example, in the case where the underlying connectivity driver 180 is an implementation of JDBC, the database proxy driver can be an implementation of the JDBC 2.0 API, developed by Sun Microsystems, Inc. of Palo Alto, Calif. FIG. 2 is a UML diagram of a JDBC-compliant database proxy driver which has implemented several of the core classes of JDBC 2.0. In particular, the core classes of JDBC 2.0 can include a driver manager 205 which can manage the registration and activation of a database driver specific to one or more particular database engines.

The core classes also can include a connection class 210, a statement class 215 and a result set 220 class. Each of the connection 210, statement 215 and result set 220 classes can be used in combination with the driver manager 205 to establish a back end database connection and to issue a data access directive. For example, using the JDBC 2.0 compliant classes illustrated in FIG. 2, the following Java code can both establish a back end database connection and execute a database query:

Connection c=
DriverManager.getConnection("jdbc:my_subprotocol: "my_subname");
Statement s=c.createStatement( );
ResultSet rs=s.executeQuery("SELECT name FROM nametable");

In accordance with the inventive arrangements, a Proxy-Driver class 225 can be specified which implements the Driver class of JDBC. Additionally, ProxyConnection 230 and ProxyStatement 235 classes can be specified which implement the Connection 210 and Statement 215 classes, respectively, of JDBC. The ProxyDriver 225, ProxyConnection 230, and ProxyStatement 235 classes can further include or invoke edge task logic, for example logic directed to load balancing, caching and the like. Inasmuch as each of the ProxyDriver 225, Proxy Connection 230 and ProxyStatement 235 classes implement the Driver, Connection 210 and Statement 215 classes of JDBC, however, each of the ProxyDriver 225, Proxy Connection 230 and ProxyStatement 235 classes can be seamless integrated into an application which has been configured for integration with JDBC.

Figure 3:
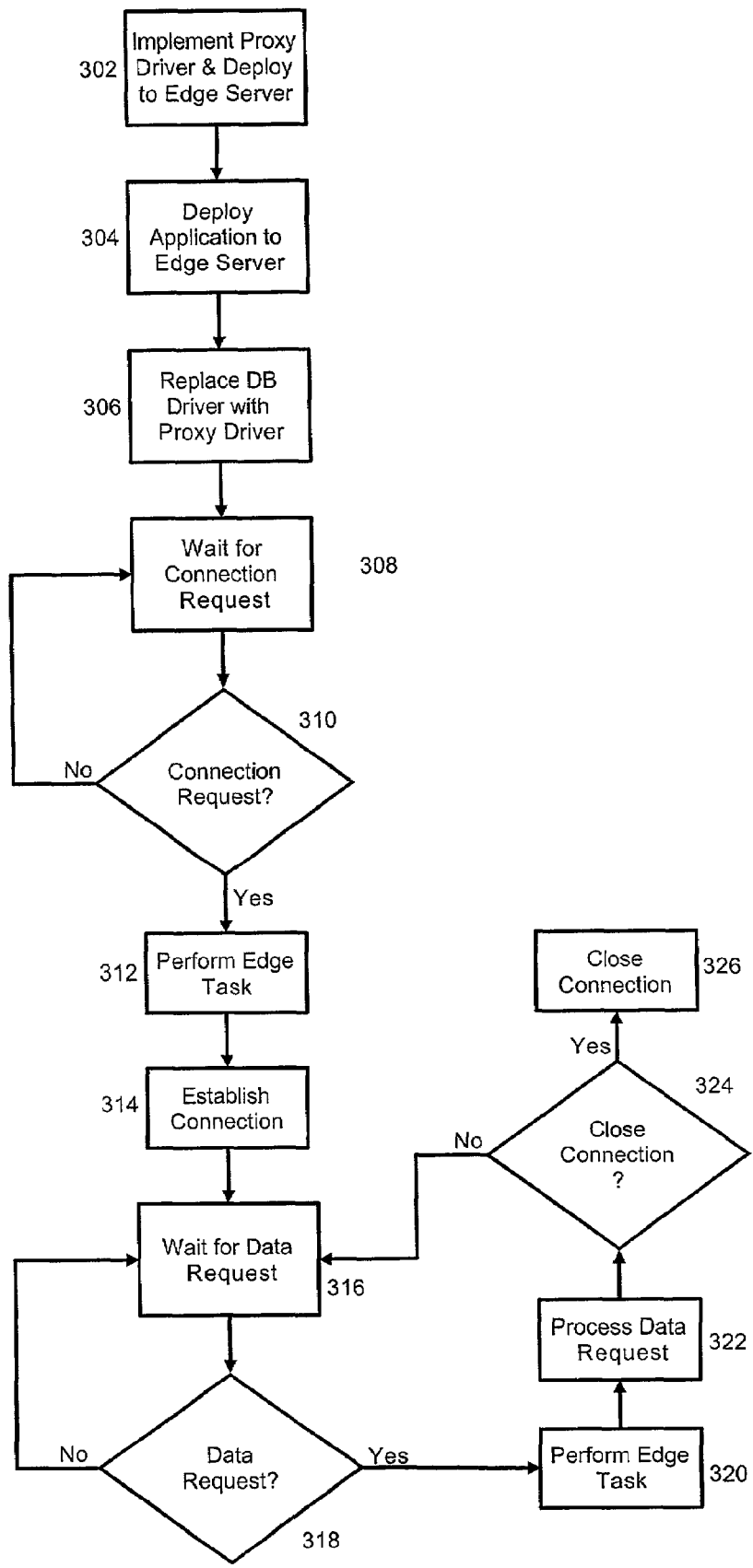
FIG. 3 is a flow chart illustrating a method for configuring and operating the database proxy driver of FIG. 1 to perform application management while handling data requests.

FIG. 3 is a flow chart illustrating a method for configuring and operating the database proxy driver of FIG. 1 to perform application management while handling data requests. The method can begin in blocks 302 and 304 in which the proxy driver of FIG. 2 can be implemented and deployed in an edge server along with the underlying database connectivity driver and the database driven application. In block 306, the database driven application can be re-configured to utilize the database proxy driver of FIG. 2 in lieu of the underlying database connectivity driver. Also, the database proxy driver can be registered to the underlying database connectivity driver. Subsequently, the application can be initialized for use by end-users.

Once initialized, the application can wait for a connection request in blocks 308 and 310. Once a connection request has been received, the application can create a database connection using a method call exposed by the database proxy driver. Once the connection method of the proxy driver has been invoked, in block 312, one or more edge tasks can be performed. Examples of edge tasks can include load balancing and caching. Additionally, in block 314, the database proxy driver can invoke the connection method of the underlying database connectivity driver, thereby establishing a database connection. Notably, in block 314 the database proxy driver can establish other database connections using the underlying database connectivity driver as required by the edge task— particularly where the edge task is a load balancing operation.

In any case, once the connection has been established, in blocks 316 and 318 the application can wait for data requests. An exemplary data request can include a request to read data from a database, or a request to write data to a database. When the application receives a data request from an end-user, the application can service the data request using a method call exposed by the database proxy driver. Once the data service method of the proxy driver has been invoked, in block 320, again one or more edge tasks can be performed. Additionally, in block 322, the database proxy driver can invoke the data service method of the underlying database connectivity driver.

Thus, for example, where the data request is a query and the edge task is load balancing, upon receipt of the request for a query, the database proxy driver can identify a target database server based upon load conditions and can forward the query to the identified database server. By comparison, where the data request is a query and the edge task is caching, the database proxy driver first can inspect the local cache before issuing the query to a back end database server. Finally, the proxy driver can be configured to read from a local cache, but to write through the local cache to the back end server.

In any event, in block 324 it can be determined whether a request to close the connection has been received. If so, in block 326 the database proxy driver can invoke a corresponding close connection method in the underlying database connectivity driver. Otherwise, the method can return to blocks 316 and 318 in which the application can await the next data request. Importantly, a log can be maintained of all or selected portions of the database and application activities. Where one of the edge tasks is a cache, the log can be used to tune local cache consistency strategies.

In particular, when servicing data access requests in block 322, meta-data such as transport protocol headers, bean information and the like can be inspected and collected. Once the connection has been closed, the collected meta-data can be used by an administration process in the edge server to determine how and where portions of the application can be re-positioned onto edge devices. In addition, the provisioning decisions associated with those portions of the application can be tuned, those provisioning decisions including caching, shadowing, remote access, initial subscription and replication rules.

Finally, one or more sets of rules can be generated based upon the collected meta-data which can be used to direct data requests to instances of the application which are more likely to respond quickly based upon database latencies experienced for data patterns represented by particular header patterns. That is to say, the history reflected by the log file can be used to learn the relationship, if any, between the request headers, the database access patterns and the variations in database responses to those patterns.

Thus, the present invention can viewed as an additional layer between the application and the underlying database connectivity drivers. Merely be re-configuring connectivity references in the application, all database calls can be processed in the database proxy driver of the present invention. The database proxy driver therefore can perform edge tasks transparently while also invoking the database access functionality of the underlying database connectivity drivers. Significantly, the addition of edge task processing functionality can occur without modifying either the application or database server.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A database access method within a database proxy driver, the method comprising:
   receiving a database connectivity request, from a database driven application, through a corresponding second exposed interface;
   forwarding said database connectivity requests, to an universal database connectivity driver, through a corresponding first exposed interface which matches a prototype of said second exposed interface; and,
   performing at least one auxiliary task in addition to forwarding said database connectivity request.

2. The database access method of claim 1, further comprising performing each of the receiving, forwarding and performing steps in an edge device.

3. The database access method of claim 2, wherein said performing step comprises performing a load balancing task.

4. The database access method of claim 2, wherein said performing step comprises performing a database caching task.

5. The database access method of claim 1, further comprising:
   collecting meta-data for each received database connectivity request; and,
   modifying operation of said auxiliary task based upon an analysis of said collected meta-data.

6. The database access method of claim 5, wherein said modifying step comprises generating rules which direct database connectivity requests to particular instances of a database server which are most likely to respond quickly based upon database latency patterns inherent in said collected meta-data.

7. The database access method of claim 6, wherein said modifying step comprises selectively caching result sets in a database cache based upon request frequency patterns inherent in said collected meta-data.

* * * * *